Sept. 16, 1952     E. P. WHITLOW     2,610,481
HEAT TRANSFER DEVICE
Filed July 14, 1948
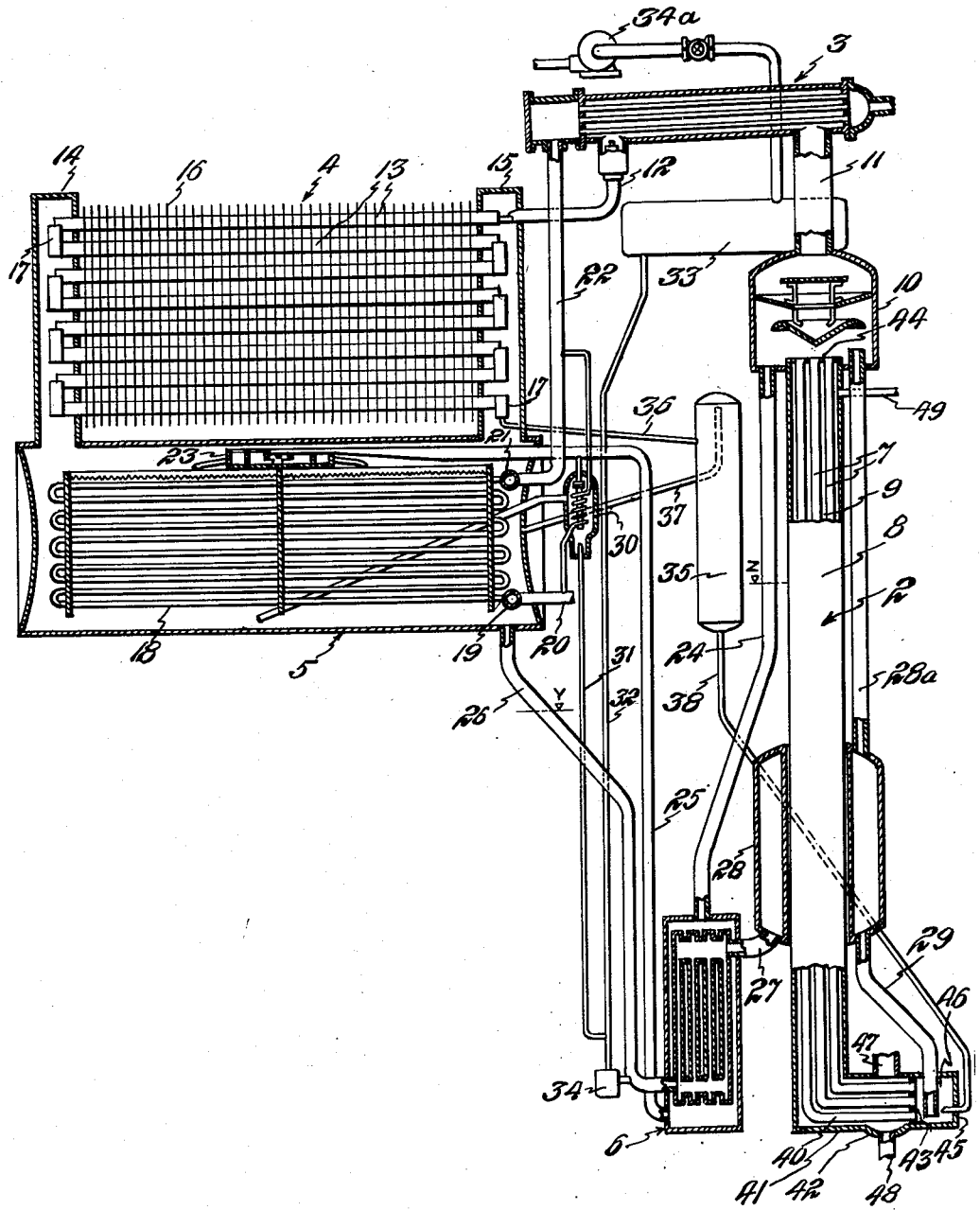
INVENTOR.
Eugene P. Whitlow
BY
Oliver S. Titcomb
his ATTORNEY Patented Sept. 16, 1952

2,610,481

UNITED STATES PATENT OFFICE 2,610,481

HEAT TRANSFER DEVICE

Eugene P. Whitlow, Evansville, Ind., assignor to Servel, Inc., New York, N. Y., a corporation of Delaware Application July 14, 1948, Serial No. 38,652

3 Claims. (Cl. 62—119)

The present invention relates to heat transfer devices, such as the generator of an absorption refrigeration system, and more particularly to a construction and arrangement of parts for preventing the accumulation of condensate around the heat transfer surfaces.

Heat transfer devices of the kind to which the present invention may be applied comprise a vertically arranged wall or walls usually in the form of tubes adapted to be contacted on one side by a condensable heating vapor such as steam and contacted on the other side by a fluid to be heated. The sides of the tubes to be heated are enclosed to provide a chamber for the heating vapor. When iron or steel tubes are used, condensate of the heating vapor accumulates around and immerses their lower ends causing localized corrosion and pitting, especially at the surface of the liquid condensate. When tubes of a metal such as copper are enclosed in a heating chamber of iron or steel, the unequal expansion of the tubes and chamber produces undesirable stresses on the tube sheets and even when the tubes and chamber are of the same metal stresses are apt to be produced due to unequal expansion of the parts.

It is the object of the present invention to provide a construction and arrangement of parts for draining condensate from the heating chamber at a level below the tubes to avoid localized corrosion and pitting of iron or steel tubes and to reduce the stresses applied to the tube sheets by unequal expansion of the parts. To this end, the heating chamber is extended below the tubes so that condensate flows from the tubes to the bottom of the heating chamber constituting a sump. This may be accomplished by directing the lower end portions of the tubes laterally above the bottom of the heating chamber and providing a drain conduit from the chamber at a level below the lowermost tube. When condensate merely flows over the surface of iron or steel tubes localized corrosion and pitting are avoided. The right angular bends in the tubes also permit flexing of the tubes with very little stress applied to the tube sheets.

The above objects and details of construction will become more apparent from the following description and drawing in which like reference characters denote like parts throughout the several views. The drawing, however, is for the purpose of illustration only and does not limit the scope of the invention, reference being had for this purpose to the appended claims.

In the drawing, the single figure is a diagrammatical view of an absorption refrigeration system showing the present invention applied to the generator thereof.

While the present invention may be applied to other heat transfer devices such as heating radiators, surface condensers or the like having vertical tubes, it is particularly adapted for use in a generator of an absorption refrigeration system of the type illustrated and described in the United States Letters Patent of Albert R. Thomas, No. 2,282,503, issued May 12, 1942, and entitled Refrigeration. Such a refrigeration system operates in a partial vacuum and utilizes water as a refrigerant and a salt solution as an absorbent. The refrigeration system comprises a generator 2, a condenser 3, an evaporator 4, an absorber 5 and a heat exchanger 6 interconnected for the circulation of a refrigerant and absorbent. The generator 2, later to be explained in detail, has a series of upright tubes 7 enclosed in a jacket 8 to provide a heating chamber 9 therebetween. A heating medium such as steam is supplied to the chamber 9 and transfers its heat through the tubes 7 to heat absorption solution therein and expel refrigerant vapor therefrom. The expelled vapor rises in the tubes and lifts absorption solution from which the vapor is expelled by a climbing film vapor lift action. The vapor and absorption solution enter a separating chamber 10 at the top of the tubes and the vapor flows from the chamber through a conduit 11 to the condenser 3 where it is liquefied. Liquid condensate flows from the condenser 3 through a conduit 12 to the evaporator 4 and means are provided in the conduit for permitting the flow of liquid refrigerant and non-condensable gases while maintaining a difference in pressure.

The evaporator 4 comprises a plurality of substantially horizontal tubes 13. The tubes 13 extend between headers 14 and 15 and have a series of heat transfer fins 16 for contact by a medium to be cooled such as a stream of air. Cups 17 in the headers 14 and 15 receive liquid refrigerant flowing from each tube 13 and direct it into the next lowermost tube so that the liquid refrigerant flows successively through each tube from the top to the bottom of the evaporator. The headers 14 and 15 of the evaporator 4 open into the top of the absorber 5 to permit refrigerant vapor evaporated in the evaporator to flow to the absorber. Mounted in the absorber 5 are banks of cooling coils 18 to which cooling water is supplied through the header 19 and supply pipe 20 from any suitable source such as a city water main, cooling tower or the like. Cooling water from the bank of cooling coils 18 is delivered through a header 21 and conduit 22 to the inlet of the condenser 3.

Absorption liquid weak in refrigerant or, in other words, concentrated salt solution flows from the separating chamber 10 to a liquid distributor 23 in the absorber 5 in a path of flow including the conduit 24, liquid heat exchanger 6 and conduit 25. The liquid absorbent is divided by the liquid distributor 23 for gravity flow over the bank of cooling coils 18 to absorb refrigerant vapor from the evaporator 4. Liquid absorbent strong in refrigerant or, in other words, a dilute salt solution flows from the absorber 5 to the generator 2 in a path of flow including the conduit 26, liquid heat exchanger 6, conduit 27, stabilizing vessel 28 and conduit 29. Preferably a pressure equalizing conduit 28a is provided between the stabilizing vessel 28 and separating chamber 10.

The generator 2 and condenser 3 operate at one pressure and the evaporator 4 and absorber 5 operate at a lower pressure and the difference in pressure is maintained between the condenser and evaporator by means in the conduit 12 and between the absorber and the generator by liquid columns into conduits 25 and 26. The liquid level in conduit 26 is indicated by the reference character $y$ while the liquid level in the conduit 24 connected to the conduit 25 through the heat exchanger 6 is indicated by the reference character $z$.

A purging device 30 of the type described and claimed in United States Letters Patent to Charles A. Roswell, No. 2,384,861, issued September 18, 1945, may be provided for continuously withdrawing non-condensable gases from the absorber 8 and transferring them to an inactive part of the system. Suffice it to state herein that the purging device 30 is in the form of an auxiliary absorber connected to withdraw non-condensable gases from the absorber 5 and deliver the gases between alternate slugs of absorption solution through a fall tube pump 31 to the lower end of a riser tube 32. The non-condensable gases ascend in the riser tube 32 to a storage vessel 33 and the absorption solution flows through the connection 34 to the return conduit 26. The non-condensable gases may be removed from the storage vessel 33 from time to time by an exhaust pump 34a.

A concentration control vessel 35 of the type described and claimed in a copending application of Lower McNeely, Serial No. 539,620, filed July 10, 1944 is connected to the lowermost cup 17 of the evaporator 4 by a conduit 36 and has a combined overflow and vent conduit 37 connected to the absorber 5. The bottom of the concentration control vessel 35 is connected to the generator 2 by a conduit 38. During operation of the refrigeration system a quantity of liquid refrigerant, water, will be stored out of solution in a liquid column in conduit 38 and concentration vessel 35 and the height of the liquid column and quantity of liquid stored in the concentration vessel will vary with variations in the difference in pressure in the two sides of the system.

In accordance with the present invention the generator 2 is so constructed and arranged as to drain condensate from the heating chamber 9 at a level below the tubes 7 and to reduce the stresses applied by the ends of the tubes. In the illustrated embodiment the lower end portions 40 of the generator tubes 7 are bent to extend laterally at right angles to upright portions at a level above the bottom of the heating chamber 9. Preferably, the lower end 41 of the packet 8 also extends laterally to conform to the direction of the tube ends 40 and its bottom is formed to provide a sump 42 below the lowermost lateral end portion 40 of the tubes 7. A tube sheet 43 is provided between the tube ends 40 and lateral portion 41 of the jacket 8 and a tube sheet 44 is provided between the upper ends of the tubes 7 and the jacket. The tube sheets 43 and 44 are welded to the jacket and to the ends of the tubes 7 to hermetically seal the joints between the separating chamber 10 and heating chamber 9. The separating chamber 10 surrounds the jacket 8 adjacent its upper end and is also welded thereto to provide an hermetically sealed joint.

The lower laterally extending portion 41 of the jacket 8 projects beyond the tube sheet 43 and is closed by a plate 45 welded thereto in spaced relationship to the tube sheet 43 to provide an inlet chamber 46 at the lower ends of the tubes. Heating vapor, such as steam, from any suitable source is supplied to the heating chamber 9 through a conduit 47 connected to the laterally extending portion 41 of the jacket 8. A condensate drain pipe 48 is connected to the sump 42 at the bottom of the laterally projecting portion 41 of the jacket 8 to drain condensate from the heating chamber 9 at a level below the lateral portion 40 of the lowermost tubes 7 and tube sheet 43. Conduits 29 and 38 from the stabilizing vessel 28 and concentration vessel 35, respectively, are connected to the inlet chamber 46 to deliver liquid adjacent the bottom thereof. Preferably, an atmospheric vent pipe 49 is connected to the heating chamber 9 at its upper end to maintain the steam in the chamber at atmospheric pressure. One form of the invention having now been described in detail, the mode of operation is explained as follows.

Steam supplied through the conduit 47 enters the heating chamber 9 and flows upwardly therein. Heat from the steam is transferred through the tubes 7 to heat solution therein and expel refrigerant vapor therefrom as previously explained. The heating steam condenses on the tubes 7 and flows downwardly along their sides. The condensate then drips from the laterally extending portions 40 of the tubes onto the bottom wall of the jacket 8, flows into sump 42 and drains through the conduit 48 at a level below the lowermost laterally extending tube portion 40 and tube sheet 43. The flow of condensate over the tubes 7 during operation of the system produces very little corrosion because the hot condensate absorbs very little oxygen but between periods of operation such condensate will absorb oxygen as it cools and produce severe corrosion, especially at the liquid level. With the present arrangement, the condensate immediately drains from the heating chamber 9 so that the tubes 7 and tube sheet 43 dry very quickly which avoids the severe corrosion occurring when condensate accumulates and cools.

When the generator 2 is heated any unequal expansion of tubes 7 and jacket 8 results in a flexing of the bent tubes without applying appreciable stress on the tube sheets 43 and 44. The right angular bends in the tubes 7 permit a bending or flexing of the tubes over a relatively long portion of their length and in a direction at right angles to the plane of the tube sheets.

Refrigerant vapor flows from the separating chamber 10 to the condenser 3 where it is liquefied and the liquefied refrigerant flows to the evaporator 4 where it is evaporated at a lower pressure and temperature to produce a refrigerating effect. Liquid absorbent lifted by the upright tubes 7 flows from the separating chamber 10 to the absorber 5 through the conduit 24, liquid heat exchanger 6 and conduit 25 to the liquid distributor 23 where it is distributed for flow over the banks of cooling coils 18. The absorption solution in the absorber 5 absorbs refrigerant vapor from the evaporator 4 and flows to the generator 2, through the conduit 26, heat exchanger 6, conduit 27, stabilizing vessel 28 and conduit 29 to the inlet chamber 46 of the generator 2 to complete a cycle of operation.

It will now be observed that the present invention prevents the accumulation of condensate around the heating surfaces of heat transfer devices. It will still further be observed that the present invention provides a construction and arrangement of elements in the generator of an absorption refrigeration system for draining condensate at a level below the vapor lift tubes and reducing the stresses applied to the tube sheets.

While only a single embodiment of the invention is herein illustrated and described it will be understood that modifications in the construction and arrangement of parts can be made without departing from the spirit or scope of the invention. Therefore, without limitation in this respect, the invention is defined by the following claims.

I claim:

1. A generator of an absorption refrigeration system having a plurality of tubes for lifting liquid by vapor lift action, a heating chamber surrounding the tubes, a conduit for supplying steam to the heating chamber, the lower ends of said tubes extending laterally above the bottom of the heating chamber, and a conduit connected to the bottom of the heating chamber for draining condensate at a level below the laterally extending portion of the lowermost tube whereby to prevent accumulation of condensate around the tubes.

2. A generator of an absorption refrigeration system comprising a plurality of upright tubes having laterally extending portions at their lower ends, a jacket surrounding the tubes in spaced relation thereto and having a laterally extending portion at its lower end, a tube sheet between the tubes and jacket at each end of the tubes, the lateral portion of the jacket extending beyond the tube sheet to provide an inlet chamber for liquid to be heated, a conduit connected to the jacket for supplying steam to the heating chamber, and a conduit connected to the bottom of the laterally extending portion of the jacket for draining condensate from the bottom of the heating chamber at a level below the lowermost tube whereby to prevent accumulation of condensate around the tubes and reduce the stress on the tube sheets caused by unequal expansion of the tubes and jacket.

3. In an absorption refrigeration system having a plurality of elements including a generator interconnected for the circulation of refrigerant and absorbent, said generator having upright heat transfer wall surfaces through which heat is transferred between heating vapor contacting one side and absorption solution contacting the other side, a heating chamber enclosing the side of the heat transfer wall surfaces contacted by vapor, a conduit for supplying vapor to the heating chamber which condenses on the heat transfer wall surfaces, a sump below the heat transfer wall surfaces to which condensate flows by gravity, all of the wall surfaces on which vapor condenses sloping downwardly so that condensate will flow into the sump without accumulating on any part thereof, and a drain conduit connected to the sump whereby to prevent the accumulation of condensate on any part of the heat transfer wall surfaces.

EUGENE P. WHITLOW.

REFERENCES CITED

The following references are of record in the file of this patent:

UNITED STATES PATENTS

| Number | Name | Date |
| --- | --- | --- |
| 269,243 | Stillson | Dec. 19, 1882 |
| 2,318,621 | O'Brien | May 11, 1943 |
| 2,411,436 | Kopp | Nov. 19, 1946 |